May 23, 1961　　　G. O. BOEHM ET AL　　　2,985,300
TESTING OF MAGNETIC MATERIALS
Filed April 4, 1956　　　　　　　　　　　　　　　　2 Sheets-Sheet 1

INVENTORS
GILBERT O. BOEHM
BENJAMIN H. MATTESON
BY
Joe L. Koerber
ATTORNEY

May 23, 1961 G. O. BOEHM ET AL 2,985,300
TESTING OF MAGNETIC MATERIALS
Filed April 4, 1956 2 Sheets-Sheet 2
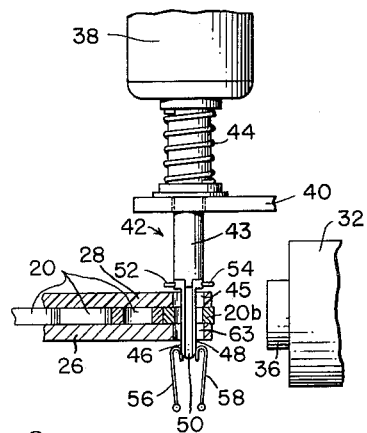
FIG.4a
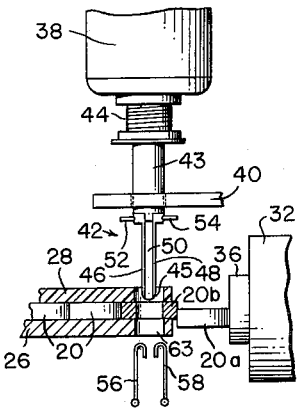
FIG.4b
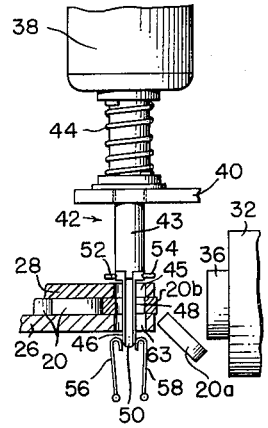
FIG.4c
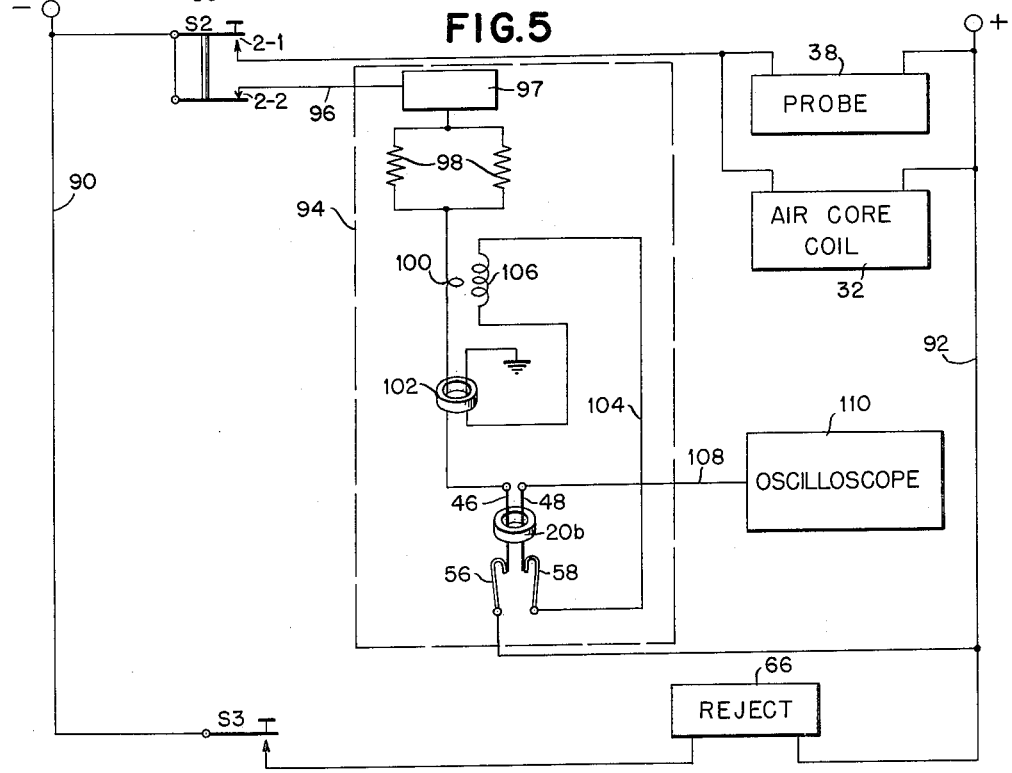
FIG.5
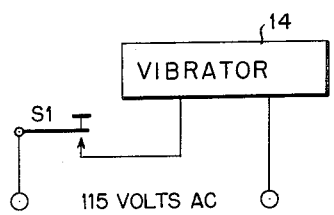

United States Patent Office 2,985,300
Patented May 23, 1961

2,985,300
TESTING OF MAGNETIC MATERIALS
Gilbert O. Boehm, Kingston, and Benjamin H. Matteson, Jr., New Paltz, N.Y., assignors to International Business Machines Corporation, New York, N.Y., a corporation of New York Filed Apr. 4, 1956, Ser. No. 575,997

7 Claims. (Cl. 209—81)

This invention relates to a magnetic material testing apparatus and more particularly to improved apparatus for testing magnetic cores.

This invention is particularly designed for testing the type of cores that are used in magnetic memory systems for computers and in other magnetic switching circuits which require many magnetic cores having uniform magnetic properties. These cores usually are toroidal in shape with a relatively small inside diameter.

Previous core testers have not been wholly satisfactory due to a tendency to break the extremely hard and brittle cores which are very small in size. Problems in breakage arise when the cores are positively moved across a surface or through an aperture.

It is the primary object of this invention to obviate the above problems by providing magnetic means for transporting the cores and registering them at a test station.

A further object of this invention is to provide an apparatus for testing magnetic materials.

Another object of this invention is to provide apparatus for physically handling magnetic cores to be tested.

A further object of this invention is to provide improved apparatus for feeding cores to a test station; for aligning them at the test station; for testing the aligned cores and accepting or rejecting the tested cores in accordance wih the results of the tests.

A still further object of this invention is to provide electromagnetic apparatus for presenting a core to a test station, removing a core therefrom and for aligning a following core thereat.

Other objects of the invention will be pointed out in the following description and claims and illustrated in the accompanying drawings, which disclose, by way of example, the principle of the invention and the best mode, which has been contemplated, of applying that principle.

In the drawings:

Figs. 4a, 4b and 4c are partial views of a probe mechanism.

Fig. 5 is a circuit schematic.

Figure 1:
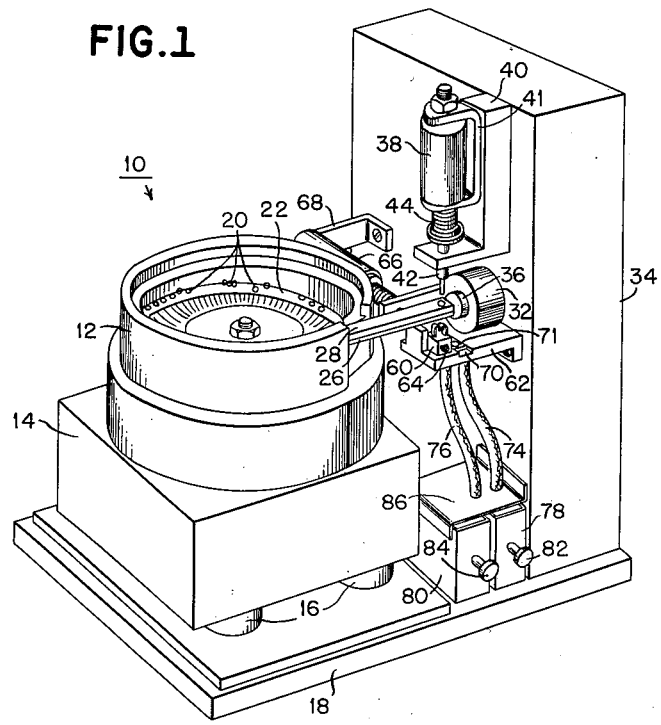
Fig. 1 is a perspective view of the core handling apparatus.

The core handler, generally designated 10, and shown in Fig. 1, includes a parts feeder comprising a bowl 12 and a vibrator 14. This is a well-known type of parts feeder and may be, for example, a Synthron parts feeder. An electrically operated vibrator is mounted in or on the heavy block 14 which is suitably mounted on four mounts 16 (two shown), on a horizontal mounting plate 18. The circuitry on the vibrator may include means for varying the frequency of the vibrations to control the rate of feeding of parts, for example, magnetic cores 20 which are placed in the bowl 12. With the vibrator 14 in operation and the bowl 12 containing cores to be fed, the vibrations cause a stream of cores 20 to be advanced up a circular ramp 22 formed on the inner side of the bowl. As the cores reach the top edge of the bowl they move single-file into a groove 24, best shown in Fig. 3, which continues into a chute 26.

Figure 3:
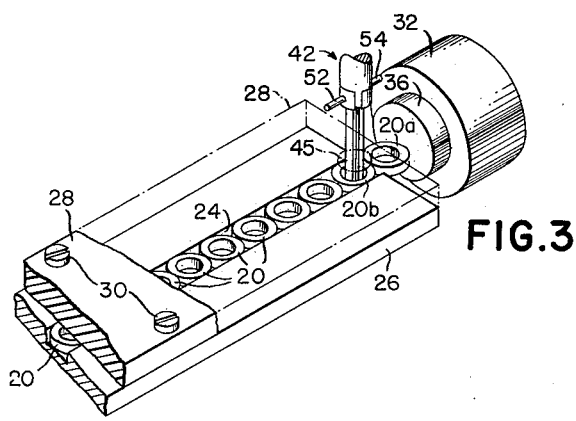
Fig. 3 is a fragmentary view of the core feed chute.

The cores must enter the chute 26 in a predetermined axial alignment, in this case horizontally as shown in Fig. 3. Any one of several known methods of alignment may be used, for example, a deflector extending over the groove 24 to engage all cores which are not horizontal to deflect them back into the bowl 12; or a small air jet may be passed over the top of the groove 24 to strike and eject all non-horizontal cores back into the bowl 12. The details of the means for feeding horizontally aligned cores into the chute 26 do not comprise a part of the invention and therefore are not shown or described in greater detail.

The groove 24 continuing into the chute 26 is covered, for example, by a plastic cap 28. The cap is fixed to the chute 26 by screws 30 to prevent foreign particles from falling into the groove and to prevent the vibrations of the core feeder from bouncing cores out of the groove 24. Also, the cap 28 restrains any tendency of a probe, described hereinafter, while being withdrawn from a core, from lifting the core from the groove.

A coil 32 having a non-magnetic core 36, for example brass, is mounted in alignment with the chute 26 on a vertical mounting plate 34 which is fixed to the horizontal mounting plate 18. The field of the coil 32, when energized, encompasses several of the foremost cores 20 in the chute 26. The brass core 36 is spaced from the end of the chute 26 by a distance slightly greater than the outside diameter of a core 20. Since the core 36 is nonmagnetic, there is no residual magnetism when the coil 32 is deenergized. When the coil is energized its field acts upon the several foremost cores 20 in the chute 26 drawing them toward the coil. The foremost core 20a, Figs. 3 and 4b, is drawn from the chute 26 and against the brass core 36 where it is suspended and held in the magnetic field. The next following core 20b abuts the suspended core 20a and is spaced precisely one core-space from the brass core 36.

Referring to Fig. 1, a probe solenoid 38 is mounted by brackets 40 and 41 on the vertical mounting plate 34. A probe 42, best shown in Figs. 4a, 4b and 4c, is fixed to the solenoid plunger 43 for vertical movement. The probe 42 is positioned for alignment with a core 20b which is spaced one core-space from the brass core 36 as described hereinbefore. The spaced position is designated as a test station. The plunger 43 is biased downwardly by a spring 44 and in the down position, the tip of the probe 42 passes through a hole 45 (Fig. 3) in the cap 28 and threads the core 20b at the test station. When the probe solenoid 38 is energized, the probe tip is withdrawn from the core 20b at which time the cover 28 acting as a stripper restrains any tendency of the extremely light weight core 20b to rise with the probe. The probe tips remain in the guiding hole 45 (see Fig. 4b).

The probe tip, best shown in Figs. 4a, 4b and 4c, comprises two electrical conductors 46 and 48 spaced by insulating material 50. Terminals 52 and 54 are provided for making connections with the respective conductors 46 and 48. Two contacts 56 and 58 set in an insulating block 60, Fig. 1 and mounted by a bracket 62 on the vertical mounting plate 34, are positioned for engaging the respective conductors 46 and 48 when the probe solenoid 38 is deenergized, and the probe tip is spring biased through the core 20b at the test station. Two terminals 64 (one shown in Fig. 1), are provided for making electrical connections to the contacts 56 and 58.

Figure 2:
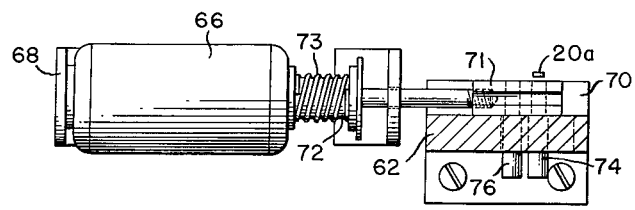
Fig. 2 is a sectional view showing the select-reject mechanism.

Referring to Figs. 1 and 2, a Reject solenoid 66 is mounted on the vertical mounting plate 34 by a bracket 68 in alignment with a groove 70 in the bracket 62. A slide 71 is fixed to the plunger 72 of the Reject solenoid 66 and is mounted in the groove 70 for sliding movement to the position shown in Fig. 2, when the solenoid 66 is energized. In the Reject position of Fig. 2, a reject drop tube 74, mounted on the slide 71, is positioned below the core 20a suspended by the coil 32. When the coil 32 is deenergized, the suspended core 20a drops into the drop tube 74. A Select drop tube 76 is mounted to the left of the tube 74, as viewed in Fig. 2, on the slide 71 and, when the solenoid 66 is deenergized, the tube 76 is moved into alignment with the suspended core 20a. Through manipulation of the Reject solenoid 66, the suspended core 20a may be dropped selectively into either drop chute. The drop tubes 74 and 76 lead to respective Reject and Select receptacles 78 and 80 and may be flexible to tolerate the movement of the slide 71. In this instance the receptacles 78 and 80 comprise drawers having handles 82 and 84. The receptacles 78 and 80 are removable for emptying.

When the probe solenoid 38 and the coil 32 are energized, the tip of the probe 42 is withdrawn from a core 20b at the test station and the several foremost cores 20 are attracted by the coil 32. The moremost core 20a (formerly the test core 20b) is suspended as described hereinbefore. When the probe solenoid 38 and the coil 32 are deenergized, the probe tip threads a newly positioned core 20b after which the suspended core 20a drops into one of the drop tubes 74 and 76.

Circuit

Referring to Fig. 5, the circuitry for the core handler and tester is schematically represented. The vibrator 14 is connected across 115 volts A.C., whereas the remaining circuitry is connected between a minus potential line 90 and a plus potential line 92. The particular voltage between the lines 90 and 92 may be any suitable voltage depending upon the particular components used in the circuits.

To operate the machine, the vibrator 14 is started by closing a switch S1 to feed cores into the chute 26 as described hereinbefore. A switch S2 having normally open contacts 2-1 and normally closed contacts 2-2 is next operated. Opening the contacts 2-2 deenergizes a test circuit generally designated 94. Closing contacts 2-1 energizes the probe solenoid 38 and the coil 32 which are connected in parallel. When the probe solenoid 38 is energized, the probe tip comprising the conductors 46 and 48 is withdrawn from the contacts 56 and 58 from the chute 26; the tip remains in the guiding hole 45 as shown in Fig. 4b. The coil 32 also is energized at that time and attracts the several foremost cores in the chute 26. The foremost core 20a acts as a spacer, as described hereinbefore, to align the following core 20b at the test station. It will be noted that, upon initially loading and starting the core handler 10, the first core through the chute 26 is not tested and acts only as a spacer. Thereafter, each core is tested in turn. Therefore, the first core must be rejected in the manner described hereinafter.

When the switch S2 is released, the contacts 2-1 open to deenergize the solenoid 38 and the coil 32; the relative dropout times of the solenoid 38 and the coil 32 are such that the probe 42 has threaded the core at the test station before the coil 32 releases the spacing core 20a. A switch S3, described in greater detail hereinafter, is operated concurrently with the switch S2 and the spacer core 20a, when released, drops into Reject receptacle 78; the contacts 2-2 reclose to energize the test circuit 94 by connection to negative voltage source 90 through line 96. The test circuit 94 comprises any suitable means 97 for emitting desirable test pulses to two parallel connected resistors 98, a single coil 100, a single turn linkage with a standard or comparison core 102, through the conductor 46 of the probe 42 which links the test core 20b, through the contact 56 to line 92. A sense winding circuit 104 runs from ground through the standard core 102, through a three turn coil 106 the field of which links the one turn coil 100 through the contact 58, the conductor 48 of the probe 42 and a line 108 to an oscilloscope 110. The test circuit 94 is described in greater detail hereinafter.

The trace on the oscilloscope is observed to determine whether the tested core 20b meets the prescribed standards. If the tested core meets the test, the switch S2 may be operated to test the next following core and to deposit the tested core in the drop tube 76 and thence to Select receptacle 80. If the core fails the test, the switch S3 is closed to energize the Reject solenoid 66 which aligns the drop tube to receive the core 20a which is suspended by the coil 32. The switch S2 is then operated to withdraw the probe 42 and energize the coil 32 to remove the tested core and to align the next core at the test station. The switch S2 is then released, the probe tip threads the newly registered core and makes contact with the contacts 56 and 58; the coil 32 is deenergized and releases the tested core which falls into the positioned Select (or Reject) tube. The switch S3 is then released and the tubes 74 and 76 return to their normal positions.

It will be apparent, in the event a greater number of cores fail the test than pass it, that it may be desirable to have the Reject tube 74 normally positioned to receive cores and to actuate the switch S3 and solenoid 66 to select cores which do pass the test. This change may be made by merely reversing the designations of the receptacles 78 and 80 and the tubes 74 and 76 and by terming the solenoid 66 as a Select solenoid rather than a Reject solenoid.

Maintaining the first assumption that the switch S3 should be operated to reject failing cores, the switch S2 alone could be successively operated so long as the tested cores passed the test. It is only when a core fails to pass the test that the switch S3 must be operated also.

Test circuit

Any suitable test circuit may be employed, depending upon the core characteristics to be tested, the required accuracy of the test, etc. The test circuit selected in this instance is the circuit 94 briefly described hereinbefore.

The basic comparison scheme is to use the standard core 102 whose signal is not acceptable, for example, by two millivolts in all voltage parameters, but which has a peaking time approximately in the middle of the allowable band and a switching time which is just at the upper limit for an acceptable core. The element 97 may be any type of mechanism or circuitry capable of emitting a signal of suitable form and magnitude. The standard core 102 is driven through the line 96 with the same pulse as the core 20b under test and has its sense winding circuit 104 linking in a direction opposite its linkage with the test core 20b. Assuming that the output on the line 108, due to pulsing the standard core 102, gives a negative response to a read pulse when received on the oscilloscope 110, and the output on the line 108, due to pulsing the test core 20b, gives a positive response, it is apparent that the difference in the responses obtained by the opposite linkage of the sense winding 104 with the standard and test cores, when applied, for example to the oscilloscope 110, may be observed to compare the standard core with the test core.

The single turn winding 100 and the three turn winding 106 in the sense winding circuit 104 serve to cancel out the effects of coupling between the two windings linking the standard core 102 and between the two conductors 46 and 48 linking the test core 20b.

If the test core 20b has a lower output than the standard core 102, then the resultant signal on the oscilloscope 110 will be negative. If the test core 20b has a higher output than the standard core 102, then the resultant signal on the oscilloscope 110 will be positive. Each core 20 may be selected or rejected in accordance with the observed signal on the oscilloscope.

Other test circuitry than that specifically described above can obviously be used such, for example, as that of Patent 2,711,509, issued June 21, 1955 to Endres et al., which employs a probe similar to that utilized herein, or Patent 2,679,025, issued May 18, 1954 to Rajchman et al., although neither of these alternative circuits has the advantage of the hereindescribed circuit of providing on the oscilloscope the net difference in output of the core being tested and that of a standard core simultaneously receiving the same test pulse.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims:

What is claimed is:

1. A device for handling discrete magnetic elements of uniform size, comprising, in combination, a delivery chute defining a station at at least one place along the chute, means for feeding said magnetic elements serially in predetermined alignment into said chute, energizable magnetic means spaced from said station by at least one element and having a magnetic field, when energized, encompassing the several foremost said elements in said chute whereby at least one of said elements, held in the field of said magnetic means aligns a next succeeding element at said station.

2. A device for handling discrete magnetic elements of uniform size, comprising, in combination, means for directing said elements in a predetermined path, means for delivering said elements serially to said first means, energizable magnetic means having a magnetic field, when energized, encompassing a plurality of the foremost of said elements along said path and acting thereon to position said elements sequentially at a predetermined point of said path and means for intermittently demagnetizing said magnetizable means.

3. A device for handling magnetic cores comprising, in combination, a delivery chute defining a station at at least one place along the chute, means for feeding a plurality of said cores serially in selected alignment into said chute, an electric coil spaced relative to said station and having a magnetic field, when energized, encompassing a plurality of foremost said cores in said chute whereby the foremost said core, held beyond the end of said chute by the field of said coil, spaces a succeeding said core for alignment at said station and means for alternately energizing and deenergizing said coil whereby, after each aligning operation, said foremost core is released from said field and displaced by gravity.

4. The device of claim 3 which includes a core receiver positioned to receive said released and displaced cores, said receiver having a plurality of compartments, and means for selectively directing the cores into said compartments.

5. A device for handling magnetic cores comprising, in combination, a delivery chute having an entrance and an exit, means for feeding a plurality of said cores serially in selected alignment into said entrance, a point along said chute at which said cores are to be sequentially aligned, an electric coil aligned with said chute and spaced from said exit, means for energizing and deenergizing said coil which, when energized, has a magnetic field encompassing a plurality of said cores nearest said exit, whereby said plurality of nearest cores is drawn toward said coil, the nearest one of said cores being drawn from said chute and suspended by said magnetic field, the next succeeding one of said cores being spaced by said suspended core in alignment with said station, said suspended core being released and removed by gravity when said coil is deenergized.

6. In a device for testing the characteristics of magnetic cores having a hole therethrough, the combination of a delivery chute defining a station at least at one place along the chute, means for feeding said cores serially in selected alignment into said chute, means positioned relative to said station for causing at least one of said cores to position another of said cores at said station and for thereafter causing said last-named core to be discharged from said chute, a test probe, means operable for reciprocally moving said probe through said hole of a core while said core is positioned at said station, receiving means having a plurality of core receptacles for receiving said discharged cores, and means operable for causing said discharged cores to be selectively received in said receptacles.

7. In a device for testing the characteristics of magnetic cores having a hole therethrough, the combination of means for directing said cores in a predetermined path, means for delivering said cores serially to said first means, means magnetizable for simultaneously attracting a plural of foremost said cores along said path and positioning said cores sequentially at a predetermined point of said path, means positioned adjacent said point for reciprocally moving at least one conductor through the hole of said core at said point for testing said core, a core receiver having a plurality of compartments, means for successively energizing and de-energizing said magnetizable means for removing tested cores from said point and for discharging said cores to said receiver, and means for selectively directing said discharged cores into said receiver compartments.

References Cited in the file of this patent

UNITED STATES PATENTS

| | | |
|---|---|---|
| 2,444,751 | Scott | July 6, 1948 |
| 2,796,986 | Bajchman | June 25, 1957 |
| 2,817,438 | Birchall | Dec. 24, 1957 |